United States Patent Office 3,334,974
Patented Aug. 8, 1967

3,334,974
MANUFACTURE OF REFRACTORY
COMPOUNDS
John Molyneux Fletcher, Didcot, Kenneth Robert Hyde, Wantage, and Fred Roberts, Cold Ash, near Newbury, England, assignors to United Kingdom Atomic Energy Authority, London, England
No Drawing. Filed Aug. 3, 1964, Ser. No. 387,174
Claims priority, application Great Britain, Aug. 7, 1963, 31,225/63
11 Claims. (Cl. 23—344)

The present invention relates to the manufacture of refractory compounds.

It is well known that the metals vanadium, titanium, thorium, niobium, zirconium, hafnium, tungsten, molybdenum, tantalum, uranium, plutonium and silicon have refractory compounds of which the carbides are the best known, although the nitrides, borides, phosphides, silicides and sulphides are also refractory compounds. These compounds are difficult to manufacture as their melting points are high, for example in the region of 2000–3000° C., and the compounds themselves are extremely hard and abrasive. The compounds are used for many purposes which depend upon their high melting points and their physical characteristics and additionally the compounds of uranium, plutonium and thorium have potential uses as nuclear fuel material.

The object of the present invention is to provide a process for the manufacture of such refractory compounds.

According to the present invention there is provided a process for the manufacture of a refractory compound of a metal from an oxide of the said metal comprising charging a fluidised bed reactor constructed of a refractory material with particles containing the said oxide, heating the fluidised bed, effecting fluidisation of the said particles using a fluidising gas which is a gas which is a gas which is inert to the particles or a gas which contains the nonmetallic portion of the said refractory compound, and supplying carbon to the reactor either as elemental carbon in admixture with the metal oxide in the particles, or as a carbon-containing gas forming part of the fluidising gas, whereby such carbon reacts with the said metal oxide.

Desirably the reactor is made of graphite and is heated by induction heating.

The term "inert" is used herein to define a gas which will not react with any of the constituents of the particles or the products of the reaction forming the refractory compound and the preferred gas is argon of high purity. The total oxygen and water vapour contents of the fluidising gas, whether or not this is inert to the constituents of the particles, should preferably be below 50 p.p.m., in order to prevent the products being re-converted to the oxide.

If the particles contain carbon, the proportion of metal oxide to carbon may be calculated on the basis of the stoichiometric requirements.

Using a mixture of metal oxide and carbon to form the particles and an inert fluidising gas, the product will be the corresponding carbide. The progress of the reaction in such a case may conveniently be followed by analysing the off-gases for the presence of oxides of carbon, the absence of such oxides indicating completion of the reaction.

Alternatively, the particles may consist of the metal oxide only, in which case, in order to prepare the carbide a hydrocarbon gas is used. The hydrocarbon gas may be benzene or methane and may contain an inert diluent such as argon.

At the temperature at which the fluidised bed reactor is maintained, the hydrocarbon gas will be cracked to give carbon which would normally be deposited on the particles in the bed. However this carbon reacts as it is formed to give the carbide and oxides of carbon and consequently the rate of feed of the hydrocarbon gas is adjusted to prevent excessive build-up of carbon. The progress of the reaction may be followed by monitoring the off-gases for the presence of such oxides of carbon and the reaction will be complete when there is no further indication of any such oxides of carbon in the off-gases.

Although, as will be described in more detail hereafter, other refractory material may be obtained from the oxide in a similar manner to the preparation of the carbide, it may be preferred that the preparation of such other refractory materials should be carried out by a two-stage process using the carbide as the intermediate stage. In this two stage process the carbide, once obtained by either of the described methods may be used as the starting material in the preparation of other refractory compounds and in this case the subsequent reaction is effected by fluidising particles of the carbide by means of a gas containing the non-metallic portion of the refractory compound and possibly also hydrogen.

Thus, the nitride may be prepared from the carbide using, as the fluidising gas nitrogen, ammonia (which is a compound of hydrogen, with nitrogen, the non-metallic portion of the product) or a mixture of hydrogen and nitrogen. For making other refractory compounds, for example borides, phosphides, silicides and sulphides, the fluidising gas may respectively be a boron hydride, phosphine, silane or hydrogen sulphide. The purpose of the hydrogen is to remove any free carbon as methane gas, this reaction requiring a temperature in the range 900–1000° C. to be used.

It should be appreciated that although a two stage process such as that hereinbefore described may not be as simple to operate as a single stage process, it may nevertheless be considered convenient to use such a two stage process because of certain advantages such a process offers. Thus, the two stages of the process may be carried out under the respective optimum conditions of gas flow, temperature, etc. Furthermore, the fluidising gas used in the second stage may react with the graphite of the fluidised bed reactor and thus it may be convenient to carry out the second stage in a reactor lined with an inert material. The inert material may be the refractory compound being made or may be alumina.

The single stage process for the preparation of refractory materials, other than the carbide, may be effected by one of a number of different methods. Each of these methods however has certain common features. Thus, the starting material is an oxide of the metal whose refractory compound is being formed, this oxide forming part or all of the solid charge to the reactor. In every case, it is also necessary that a carbon-containing material and a material containing the non-metallic portion of the product should be present in the reactor, either as part of the solid charge or part of the fluidising gas. It may be desirable to include hydrogen in the fluidising gas in order to remove any free carbon produced in the product. If hydrogen is used as part of the fluidising gas however, it is necessary that the reactor be lined with an inert material to prevent reaction between the hydrogen and the graphite of the reactor.

Thus, the single stage process may be effected by charging the reactor with a mixture of the metal oxide and carbon and fluidising the charge using a gas containing the non-metallic portion of the desired product and optionally containing hydrogen and/or argon. In an alternative arrangement, the carbon is omitted from the initial solid charge and the bed is fluidised by a mixture containing a gaseous hydrocarbon, the non-metallic portion of the product and optionally hydrogen. In a further arrangement, the solid charge consists of a mixture of the metal oxide, carbon and a compound containing the non-metallic portion of the product and fluidising with argon which optionally contains hydrogen. The compound containing the non-metallic portion of the product may be the oxide of the said non-metallic portion.

Thus, uranium nitride may be prepared either by fluidising a mixture of uranium oxide and carbon with nitrogen, possibly also containing hydrogen and/or argon, by fluidising uranium oxide particles using a mixture of benzene and nitrogen, or possibly by fluidising uranium oxide particles with a gas containing a nitrogen-containing organic compound such as ethylene diamine.

Zirconium boride may be prepared by fluidising a mixture of zirconium dioxide, boron trioxide and carbon in argon. Other refractory compounds may also be obtained in a similar manner using a suitable solid charge and fluidising gas. Thus, a sulphide might be obtained by fluidising a metal oxide with carbon disulphide or fluidising a mixture of a metal oxide and carbon with hydrogen sulphide. Similarly, phosphides might be prepared by fluidising a mixture of a metal oxide and carbon with a gas containing phosphine or phosphorous vapour. A silicide might be prepared using a solid charge of a metal oxide, silica and carbon and fluidising with argon, a charge of metal oxide and carbon with a silane as a fluidising gas or even a metal oxide charge with a mixture of hydrocarbon and silane as the fluidising gas.

The present invention may be applied not only to the preparation of a single refractory compound but also to mixtures thereof.

Thus, it is possible to prepare carbonitrides by the present method by suitably adjusting the conditions. Using a mixture of carbon and uranium dioxide in various proportions as the solid charge and nitrogen as the fluidising gas, possibly diluted with argon, carbonitrides of the formula, $U(C_xN_{1-x})$, in which $x$ has values from 0.04–1.00, may be prepared.

Mixed carbides, for example uranium-plutonium carbide and uranium-zirconium carbide, may be prepared by fluidising a mixture of the corresponding mixed oxides with carbon using argon as the fluidising gas. Mixed carbonitrides, nitrides etc. may also be prepared by an extension of the same technique.

Whichever of the many possible variations of the present invention is being used, the gas flow through the fluidised bed is arranged, in known fashion, to be sufficient to cause adequate fluidisation of the bed and the temperature at which the bed is operated is dependent on the reactants. Thus, in the case where the starting material is a mixture of uranium dioxide and carbon, the temperature should preferably be between 1350° C. and 1800° C., the reaction being very slow at the lower limit of temperature and there being incipient sintering at the higher limit. The preferred temperature is 1600° C. when the reaction will proceed to finality in approximately 1½ hours.

The particles are conveniently in the form of spheres, thus giving a spherical refractory product which is desirable for many purposes. These spheres may be formed by any known process, e.g. by gyration of granules around an abrasive track.

In order that the present invention may more readily be understood, several embodiments of the same will now be described by way of example.

In all the embodiments, unless stated otherwise, the process was carried out in a fluidised bed reactor in the form of a graphite cup ¾" in diameter and 1½" long having a central conical depression serving to locate a carbon sinter and having a fluidising gas inlet below the carbon sinter. The reactor itself is conveniently surmounted by a graphite chimney 9" long.

In operation, the graphite reactor as above described is charged approximately 1" deep with particles of the particular solid material being treated. A stream of the necessary fluidising gas is admitted to the base of the reactor at a sufficient rate to maintain the contents of the reactor in the fluidised state. Arrangements may be made for the off-gases from the reactor to be sampled for the presence of carbon monoxide or other gases, this conveniently being effected by means of gas chromatography in known fashion.

The reactor in a protective atmosphere, is placed within the work coil of a radio-frequency generator having an output of 7.5 kw. at a frequency of 500 kc./s. to 1.2 mc./s. The radio-frequency generator is switched on and the temperature within the reactor is rapidly raised to the required level and held at that temperature until the absence of a particular product gas, e.g. carbon monoxide, in the off-gases indicates that the reaction has gone to completion.

*Examples 1 and 2*

The starting material was uranium dioxide mixed with carbon. The uranium dioxide was milled to give a powder of particle size substantially all less than 5 microns. The uranium dioxide powder was then mixed with carbon having substantially the same particle size in the stoichiometric ratio to give complete reaction to the carbide, that is with a molecular ratio $UO_2:C$ of 1:3. The uranium dioxide-carbon mixture was compressed into pellets at a suitable pressure and these pellets were broken down and formed into spherical granules by gyration round an abrasive track.

The spheres thus obtained were sieved to give a fraction of sizes 300–700 microns, these spheres were then charged into the fluidised bed reactor and a stream of high purity argon (better than 99.99% pure) was admitted to the base of the reactor at a rate of about 0.5 litres per minute. The reaction zone was heated to the reaction temperature of 1500–1800° C. by means of the induction coil of the radio-frequency generator and the reaction was followed by monitoring the effluent gases for carbon monoxide.

The results of two typical preparations are given in Table I.

TABLE I

| Example | Time at Reaction Temperature (hrs.) | Product Composition | |
|---|---|---|---|
| | | Oxygen (wt. percent) | Carbon (wt. percent) |
| 1 | 3½ | 0.04 | 5.6 |
| 2 | 3 | 0.09 | 4.6 |

The products were found to contain uncombined carbon, this being attributed to pick-up of carbon from the reactor walls. The amount of free carbon may be reduced or eliminated by using rather less (about 10% less) than the stoichiometric amount of carbon in the oxide-carbon mixture.

*Examples 3 and 4*

Uranium carbide prepared as described for Examples 1 and 2 was transferred to a second fluidised bed reactor which differed from that used for the carbide preparation only in that the pot and chimney of the second reactor were lined with alumina. The fluidising gas to the second reactor was a mixture of nitrogen and the second reactor was maintained at a temperature of approximately 950° C. to give a carbonitride product. The progress of the reaction was monitored by examining the off-gases from the second reactor for the presence of methane.

The carbonitride products obtained had the compositions set out in Table II.

TABLE II

| Example | Product Composition | |
|---|---|---|
| | Nitrogen (wt. percent) | Carbon (wt. percent) |
| 3 | 2.65 | 4.57 |
| 4 | 2.18 | 4.33 |

Chemical analysis showed the presence of free carbon, the products being actually approximately 50% nitride.

Examples 5 and 6

The procedure of Examples 1 and 2 was repeated to prepare vanadium and molybdenum carbides but different reaction temperatures were used as compared with the preparation of uranium carbide. The results are summarised in Table III.

TABLE III

| Example | Composition of Reactants | Operating Temp. Range | Time at Reaction Temp. (hrs.) | Product composition | |
|---|---|---|---|---|---|
| | | | | Oxygen (wt. percent) | Carbon (wt. percent) |
| 5 | $V_2O_5/7C$ | 900–1,200 | 3 | 0.6 | 25.6 |
| 6 | $MoO_3/3.5C$ | 1,400–1,800 | 5 | | ca. 14 |

Example 7

The procedure of Example 1 was used to prepare mixed uranium-zirconium carbide. Spheroids havings a composition $UO_2/ZrO_2/3C$ were prepared and fluidised with argon at a reaction temperature in the range 1500–1600° C. to give the mixed carbide product.

Example 8–12

Mixtures of uranium dioxide and carbon containing various ratios of uranium dioxide to carbon were prepared and spheroidised as described in Examples 1 and 2. The carbon-uranium dioxide ratios used were about 10% less than those required by the stoichiometry of the desired product. The spheroids were then fluidised by a stream of nitrogen or a nitrogen/argon mixture to a temperature in the range 1450–1500° C. Both the carbon-uranium dioxide ratio in the starting material and the composition of the fluidising gas influenced the composition of the product.

The product of Example 9 contained 0.12% by weight of free carbon and that of Example 10 contained 1.4% by weight of free carbon. The oxygen content of all the products was about 0.15% by weight.

Comparison of Examples 10 and 11 indicates that the composition of the product is to a large extent governed by the nature of the fluidising gas, since, although the carbon-uranium dioxide ratio in the starting material was such as to favour the formation of a carbonitride of high carbide content, when nitrogen was used as a fluidising gas (Example 10) the carbide and nitride contents were more or less equal.

Examples 13–20

Uranium oxide spheroids were prepared in a similar manner to that described for the preparation of mixed uranium dioxide-carbon spheroids in Examples 1 and 2. Reaction was caused to occur by feeding the carbon into the bed in the form of a hydrocarbon vapour dispersed in the fluidising gas, the carbon sinter being omitted to prevent blocking by pyrolytic carbon deposits. The hydrocarbon was benzene and this was introduced into the fluidising gas by passing part of the latter through a bubbler maintained at 25° C. By varying the flow rate through the bubbler, a range of benzene concentrations in the feed gas of from 0.1–1% by volume was attainable. The oxides used were uranium dioxide and uranium trioxide and the fluidising gas was nitrogen alone; a nitrogen-hydrogen mixture (30% hydrogen) or a nitrogen-argon mixture (20% argon).

The procedure in each was carried out in three stages, namely, raising to operating temperature in the absence of benzene; reacting for varying periods whilst supplying benzene and cooling in the absence of benzene. The fluidising gas could, if desired, be varied for the different stages.

The details of several runs are summarised in Table V.

TABLE V

| Example | Oxide | Fluidising Gas | | | Relative Benzene Feed Rate (hr.⁻¹) | Temp. (°C.) | Chemical Analysis of Product, Atom Ratios | | | |
|---|---|---|---|---|---|---|---|---|---|---|
| | | Heating Stage | Reaction Stage | Cooling Stage | | | U | C | O | N |
| 13 | $UO_2$ | $N_2$ | $N_2$ | $N_2$ | 0.09 | 1,400 | 1 | 0.02 | 1.04 | 0.85 |
| 14 | $UO_2$ | $N_2/H_2$ | $N_2/H_2$ | $H_2$ | 0.08 | 1,400 | 1 | 0.20 | 1.00 | 0.46 |
| 15 | $UO_3$ | $N_2$ | $N_2$ | $H_2$ | 0.14 | 1,485 | 1 | 0.02 | 1.09 | 0.47 |
| 16 | $UO_3$ | $N_2/H_2$ | $N_2/H_2$ | A | 0.14 | 1,470 | 1 | 0.07 | 0.27 | 0.81 |
| 17 | $UO_3$ | $N_2/A$ | $N_2/A$ | A | 0.14 | 1,480 | 1 | 0.08 | 0.82 | 0.62 |
| 18 | $UO_2$ | $H_2/N_2$ | $H_2/N_2$ | A | 0.14 | 1,430–1,520 | 1 | 0.26 | 0.13 | 0.68 |
| 19 | $UO_3$ | $N_2/H_2$ | $N_2/H_2$ | A | 0.075 | 1,490–1,570 | 1 | 0.22 | 0.00 | 0.78 |
| 20 | $UO_3$ | $N_2/H_2$ | $N_2/H_2$ | $H_2$ | 0.07 | 1,470–1,570 | 1 | 0.07 | 0.37 | 0.77 |

The details of several preparations are summarised in Table IV.

TABLE IV

| Example | Reagents | | Product Formula |
|---|---|---|---|
| | C/UO₂ ratio | Fluidising gas | |
| 8 | 1.63 | $N_2$ | $U(C_{0.07}N_{0.94})$ |
| 9 | 2.17 | $N_2$ | $U(C_{0.31}N_{0.69})$ |
| 10 | 2.80 | $N_2$ | $U(C_{0.52}N_{0.48})$ |
| 11 | 2.80 | $A/N_2(1,000/1)$ | $U(C_{0.90}N_{0.07})$ |
| 12 | 2.80 | $A/N_2(10,000/1)$ | $U(C_{0.97}N_{0.03})$ |

The benzene feed rate is expressed as the mol. feed rate of benzene per unit mol. of uranium. Although 100% conversion in terms of removal of the initial oxygen could be obtained (see Example 19), the product was not pure uranium nitride but rather the carbonitride. In general it appeared that the use of a mixed nitrogen-hydrogen fluidising gas gave the best results (compare Examples 15, 16 and 17). It was found that at low conversions, the mononitride, with no higher nitride, could only be obtained if the bed was held at 1450–1500° C. for 15–30 minutes in hydrogen at the end of the preparation.

Example 21

A mixture of zirconia, boron trioxide and carbon was formed into spheres using a process similar to that described in Examples 1 and 2. The spheres thus produced were fluidised in argon at 1,800° C. to give zirconium boride.

The foregoing examples are intended to show some possible applications of the present invention but it should be appreciated that the scope of the invention is not limited to the processes set forth in the examples and that many variations are possible without departing from the scope of the invention as hereafter claimed.

We claim:

1. A two stage process for the manufacture of a refractory compound having a non-metallic portion selected from the group consisting of nitrogen, boron, phosphorus, silicon, and sulfur and a metal portion selected from the group consisting of vanadium, titanium, thorium, niobium, zirconium, hafnium, tungsten, molybdenum, tantalum, uranium, plutonium and silicon, said metal and non-metal portions being different, from an oxide of the said metal, such process comprising a first stage wherein the said metal oxide is converted to the corresponding metal carbide and comprising charging particles consisting of an admixture of the said metal oxide with carbon into a fluidised bed reactor vessel constructed of a refractory material, fluidising the said particles with an inert gas and heating the reactor vessel to a first reaction temperature to form said metal carbide, and a second stage wherein the metal carbide from the first stage is converted to a said refractory compound of the said metal and comprising effecting fluidising of the metal carbide in a reactor vessel by means of a fluidising gas containing the non-metallic portion of the refractory compound and heating the reactor vessel to a second reaction temperature.

2. The process of claim 1 wherein the fluidising gas also contains hydrogen.

3. The process of claim 2 wherein the metal portion is uranium and the uranium carbide particles are converted to uranium carbonitride by fluidising the particles using a mixture of hydrogen and nitrogen as the fluidising gas and said second reaction temperature is about 950° C.

4. A one-stage process for the production of a refractory compound having metallic and non-metallic portions, wherein said metallic portion is selected from the group consisting of vanadium titanium, thorium, niobium, zirconium, hafnium, tungsten, molybdenum, tantalum, uranium, plutonium and silicon and said non-metallic portion is selected from the group consisting of nitrogen, sulfur, phosphorus, silicon and boron, said metallic and non-metallic portions being different: said process comprising placing in a refractory fluidised bed reactor a charge of particles formed of a mixture of carbon with an oxide compound containing said metallic portion; passing a fluidising gas through the said particles at a rate sufficient to cause fluidisation thereof, the fluidising gas containing one of the substances selected from the group consisting of nitrogen, sulphur, phosphorus, silicon and boron-containing substances; and heating the reactor vessel to a reaction temperature.

5. The process of claim 4 wherein the fluidising gas contains hydrogen in chemical combination with one of the elements selected from the group consisting of nitrogen, sulphur, phosphorus, silicon and boron.

6. A process for the manufacture of uranium carbonitride according to claim 4 wherein the particles consist of uranium dioxide in admixture with carbon, and the fluidising gas contains nitrogen.

7. The process of claim 6 wherein the fluidising gas comprises a mixture of nitrogen and argon.

8. A single-stage process for the manufacture of a refractory compound having a non-metallic portion selected from the group consisting of nitrogen, boron, phosphorus, silicon and sulfur, and a metallic portion selected from the group consisting of vanadium, titanium, thorium, niobium, zirconium, hafnium, tungsten, molybdenum, tantalum, uranium, plutonium and silicon, said metal and non-metal portions being different from an oxide containing said metallic portion, such process comprising charging particles of the said oxide into a fluidised bed reactor vessel constructed of a refractory material, fluidising the said particles in the said reactor vessel by means of a fluidising gas containing the non-metallic portion of the refractory compound and a carbon-containing gas, and heating the reactor vessel to a reaction temperature.

9. A process for the manufacture of uranium carbonitride according to claim 8 wherein particles of uranium dioxide are fluidised in a gas comprising a mixture of benzene and nitrogen.

10. A one-stage process for the manufacture of a refractory compound having a non-metal portion selected from the group consisting of nitrogen, boron, phosphorus, silicon and sulfur portion selected from the group consisting of vanadium titanium, thorium, niobium, zirconium, hafnium, tungsten, molybdenum, tantalum, uranium, plutonium and silicon, said metal and non-metal portions being different, from an oxide of the said metal, such process comprising charging particles consisting of an admixture of the said non-metal portion into a fluidised bed reactor vessel constructed of a refractory material, fluidising the said particles with an inert gas, and heating the reactor vessel to a reaction temperature to form said metal oxide with carbon and a compound containing the said refractory compound.

11. The process of claim 10 wherein the said compound containing the non-metallic portion of the refractory compound is an oxide.

References Cited
UNITED STATES PATENTS

| | | | |
|---|---|---|---|
| 1,941,610 | 1/1934 | Macready | 23—134 |
| 3,077,385 | 2/1963 | Robb | 23—208 |
| 3,162,509 | 12/1964 | Davidson | 23—344 |

OTHER REFERENCES

Reactor Fuel Processing, vol. 5, No. 2, April 1962, pp. 65–66. Prepared for USAEC, available in POSL (TK9001 R43).

L. DEWAYNE RUTLEDGE, *Primary Examiner.*

S. TRAUB, R. L. GRUDZIECKI, *Assistant Examiners.*